United States Patent [19]

Higuchi

[11] Patent Number: 5,315,671
[45] Date of Patent: May 24, 1994

[54] IMAGE PROCESSING METHOD AND APPARATUS

[75] Inventor: Hirokazu Higuchi, Yokohama, Japan

[73] Assignee: Canon Kabushiki Kaisha, Tokyo, Japan

[21] Appl. No.: 739,496

[22] Filed: Aug. 2, 1991

[30] Foreign Application Priority Data

Aug. 6, 1990 [JP] Japan ................... 2-206783

[51] Int. Cl.⁵ .............................................. G06K 9/00
[52] U.S. Cl. ............................................ 382/57; 382/40
[58] Field of Search ................................. 382/57, 40

[56] References Cited

U.S. PATENT DOCUMENTS

| | | | |
|---|---|---|---|
| 3,271,738 | 9/1966 | Kamentsky | 382/57 |
| 4,058,795 | 11/1977 | Balm | 382/40 |
| 4,328,561 | 5/1982 | Convis et al. | 382/40 |
| 4,433,392 | 2/1984 | Beaven | 382/57 |
| 4,985,863 | 1/1991 | Fujisawa et al. | 382/57 |

Primary Examiner—Leo H. Boudreau
Attorney, Agent, or Firm—Fitzpatrick, Cella, Harper & Scinto

[57] ABSTRACT

An image recording apparatus for making index data from a part of image information read out of a recording medium. This apparatus comprises a memory for storing information regarding a character recognition error, a searching unit for searching the image information corresponding to search data, and a changing unit for changing a part of the search data on the basis of the information stored in the memory when the image information cannot be searched by the searching unit. Preferably, the change in search data by the changing unit is stopped by a predetermined instruction or when the number of changing operations has reached a predetermined number of changing times. Or, preferably, the search data can be rewritten to the index data by a predetermined instruction. If corresponding image information doesn't exist in the input search data, a part of the search data is changed in accordance with a character recognition error ratio which has previously been obtained, so that the image information can be searched even if there is a recognition error in the index data.

12 Claims, 4 Drawing Sheets

FIG. 3

| | | RECOGNITION RESULTS | | | | | | | | | | TOTAL | RECOGNITION ERROR [%] |
|---|---|---|---|---|---|---|---|---|---|---|---|---|---|
| | | 0 | 1 | 2 | 3 | 4 | 5 | 6 | 7 | 8 | 9 | | |
| OBJECT OF RECOGNITION | 0 | 80 | — | — | 10 | — | 4 | 2 | — | 3 | 1 | 100 | 20 |
| | 1 | 3 | 85 | — | — | — | 1 | — | 4 | — | 7 | 100 | 15 |
| | 2 | — | — | 90 | 8 | — | — | 2 | — | — | — | 100 | 10 |
| | 3 | 7 | — | — | 93 | — | — | — | — | — | — | 100 | 7 |
| | 4 | 6 | — | — | — | 87 | 2 | 1 | — | — | 4 | 100 | 13 |
| | 5 | 8 | 7 | — | — | — | 80 | — | 3 | 2 | — | 100 | 20 |
| | 6 | 10 | — | 2 | 3 | 3 | 3 | 72 | — | 5 | 5 | 100 | 28 |
| | 7 | — | 2 | — | — | 1 | — | — | 92 | — | 2 | 100 | 8 |
| | 8 | 9 | 3 | 4 | — | — | — | 3 | — | 80 | 1 | 100 | 20 |
| | 9 | 1 | — | 3 | 4 | 4 | — | — | 2 | 6 | 80 | 100 | 20 |
| | | 124 | 97 | 99 | 118 | 95 | 90 | 80 | 101 | 96 | 100 | 1000 | |

|   | TRUE ▶ | FAULT |
|---|---|---|
| A → | 0 | 3 |
|   | 6 | 0 |
|   | 8 | 0 |
| B → | 2 | 3 |
|   | 5 | 0 |
| C → | 1 | 9 |
| D → | 3 | 0 |
|   | 5 | 1 |
|   | ⋮ | ⋮ |
|   | 4 | 6 |
|   | 7 | 4 |
|   | 8 | 9 |
|   | 9 | 0 |

IMAGE PROCESSING METHOD AND APPARATUS

BACKGROUND OF THE INVENTION

1. Field of the Invention

The invention relates to image processing method and apparatus to form index data from image information by character recognition.

2. Related Background Art

Hitherto, there has been known an apparatus in which image information is read out of a recording medium and a part of the read image information is recognized and stored as index data.

The index data is stored together with the read image information and the index data is searched by search data which is supplied by an operator, so that the corresponding image information can be obtained.

In such a conventional technique, however, there is a drawback such that if image information has erroneously been recognized at the stage of the recognizing process of the image information to form index data, a searching process cannot be also executed.

SUMMARY OF THE INVENTION

The invention is made to solve the above problem and has the following construction as means for solving such a problem.

That is, there is provided an image recording apparatus for making index data from a part of image information which has been read out of a recording medium, comprising: memory means for storing information regarding a character recognition error; searching means for searching the image information corresponding to search data; and changing means for changing a part of the search data on the basis of the information stored in the memory means when the image information cannot be searched by the searching means.

Preferably, the change in search data by the changing means is stopped by a predetermined instruction or when the number of changing operations has reached a predetermined number of changing times.

Or, preferably, the search data can be rewritten to the index data by a predetermined instruction.

In the above construction, if corresponding image information doesn't exist in the input search data, a part of the search data is changed in accordance with a character recognition error ratio which has previously been obtained, so that the image information can be searched even if there is a recognition error in the index data.

BRIEF DESCRIPTION OF THE DRAWINGS

FIG. 3 is a diagram showing combinations of characters which are erroneously recognized and their ratios on the basis of results of recognition experiments; and FIG. 4 is a diagram showing combinations of characters which are arranged in accordance with the order from a higher recognition error ratio.

DETAILED DESCRIPTION OF THE PREFERRED EMBODIMENTS

A preferred embodiment according to the invention will be described in detail hereinbelow with reference to the drawings.

Figure 1:
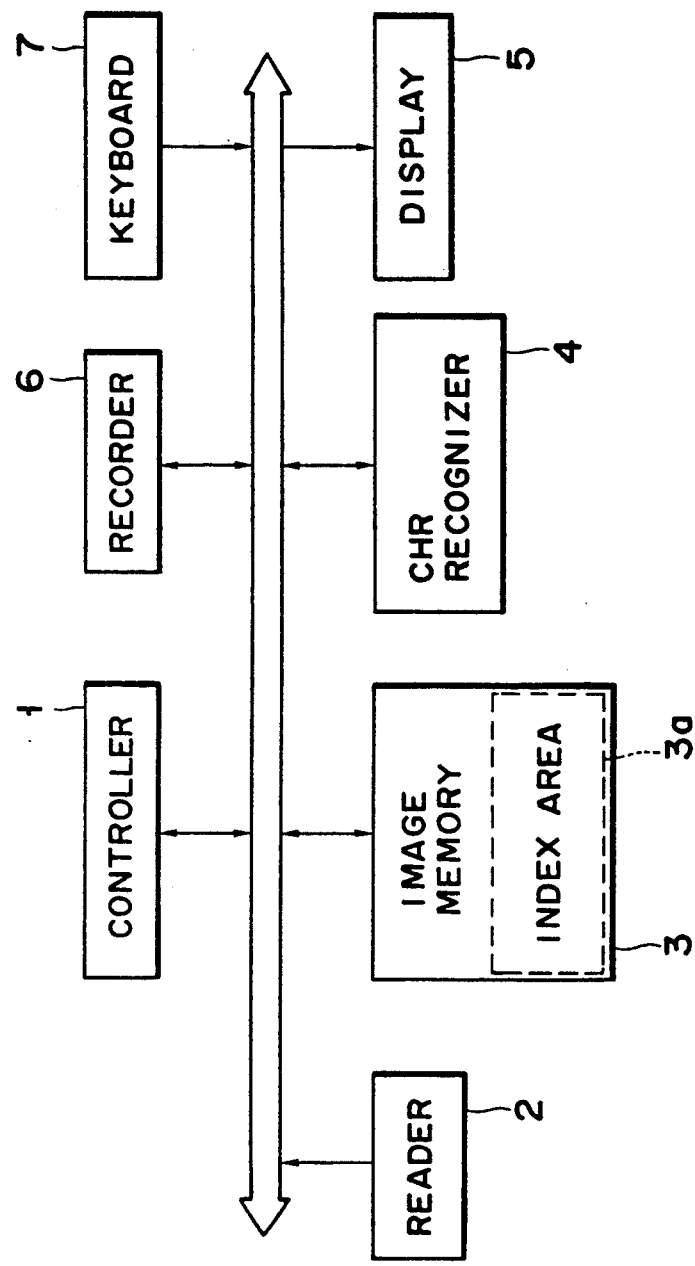
FIG. 1 is a block diagram showing a construction of an image recording apparatus according to an embodiment of the invention.

FIG. 1 is a block diagram showing a construction of an image recording apparatus according to the embodiment of the invention.

In FIG. 1, a controller 1 controls the whole operation of the image recording apparatus such as reading of image data including character information and output, recognition, search, display, etc. of the read image data. A reader 2 reads the image data from a recording medium. The read image data is temporarily stored into an image memory 3 by a control of the controller 1.

A character recognizer 4 recognized a part of the image data stored in the image memory 3 as index data. The image data, a message, or the like in the image memory 3 is displayed by a display 5. The image data, index data formed by the character recognizer 4, and combinations of characters which are erroneously recognized among characters and their recognition error ratios and the like, which will be explained hereinlater, are recorded in a recorder 6. A keyboard 7 is used for an operator to input an instruction to the image recording apparatus and search data.

When the image data is recorded or the index data is formed, the reader 2 starts the reading operation in accordance with a reading start signal from the controller 1. At the same time, the reader 2 binarizes the read image data and transfers to the image memory 3. Upon completion of the transfer, a transfer end signal is sent from the reader 2 to the controller 1.

After reception of the transfer end signal, the controller 1 sends a recognition start signal to the character recognizer 4. The character recognizer 4 recognizes the data in an index area 3a in the image memory 3 which has been preset. The result of the data recognition is sent to the controller 1. After reception of the recognition result, the controller 1 allows the image data in the image memory 3 and the index data corresponding thereto to be recorded to the recorder 6.

A searching procedure in the image recording apparatus in the embodiment will now be described hereinbelow with reference to a flowchart shown in FIG. 2.

Figure 2:
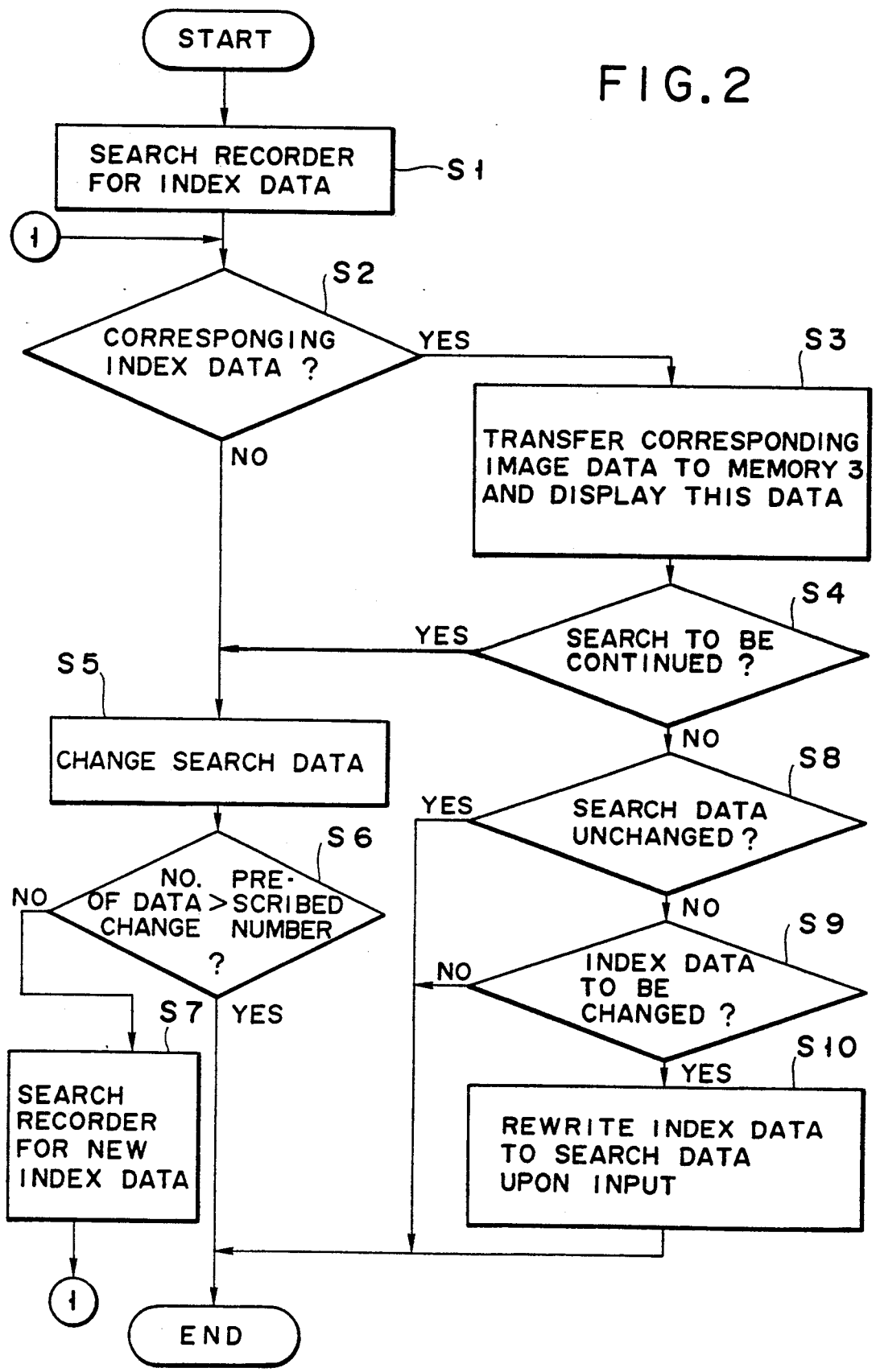
FIG. 2 is a flowchart for explaining a searching procedure in the image recording apparatus of the embodiment.

In FIG. 2, when the operator has supplied search data from the keyboard 7 and has given a search instruction to the image recording apparatus, the controller 1 searches the index data in the recorder 6 in accordance with the input search data in step S1. If the corresponding index data exists as a result of the discrimination of the index data in step S2, the controller 1 transfers the image data corresponding to the index data to the image memory 3 from the recorder 6 and displays the image data by the display 5 in the next step S3. A check is now made in step S4 to see if the searching operation is continued or not.

If the corresponding index data doesn't exist in the recorder 6 as a result of the discrimination in step S2 or if it is determined in step S4 that the searching operation is continued by a checking instruction of the operator, the processing routine advances to step S5 and the controller 1 changes the search data by a method, which will be explained hereinlater. In step S6, a check is made to see if the number of changing operations of the search data is larger than a prescribed number or not. If NO, that is, if the number of changing operations is equal to or smaller than the prescribed number, the index data is searched on the basis of the changed search data in step S7. After completion of the processing step S7, the processing routine is returned to step S2 and the presence or absence of the index data is discriminated.

If it is decided in step S4 that the searching operation is not continued, a check is made in step S8 to see if the search data is unchanged, that is, the search data is the original input data or not. If YES in step S8, the processing routine is finished. If NO, namely, if the search data has been changed in step S8, step S9 follows and if the operator decides that the searching operation is stopped, the processing routine is finished without changing the index data. However, if desired image data has been derived, step S10 follows and the index data is rewritten to the input search data.

If desired image data is not derived even after the search data was changed the prescribed number of times in the discriminating step S6, it is determined that the searching process has failed, so that the processing routine is finished.

Characters to be erroneously recognized and a method of obtaining a recognition error ratio and a method of changing the search data will now be described.

FIG. 3 shows the results derived by executing recognition experiments 100 times for each of the characters of "0" to "9" on the assumption that numerals (ten kinds of "0" to "9") are used as characters to be recognized.

In FIG. 3, it will be understood that the recognition error ratio of 6 among the above numerals is highest (28%) and that a ratio in which "0" is erroneously recognized as "3" and a ratio in which "6" is erroneously recognized as "0" among the combinations of all of the characters (numerals) are highest.

Therefore, on the basis of the results obtained, the portions excluding the ratios (locating on a diagonal line in FIG. 3) at which the characters have correctly been recognized are arranged in accordance with the order from the larger ratio and stored into the recorder 6. FIG. 4 shows results obtained in the above case.

The changing method of the search data in step S5 in FIG. 2 will now be described with reference to FIG. 4.

For instance, in the case of changing the search data such as "3210" which has been supplied by the operator, the controller 1 examines the ratio of erroneous recognition for the numerals "3", "2", "1", and "0" in forming the index data on the basis of the data shown in FIG. 4. That is, since "0" is easily erroneously recognized as "3" by reference to a point A in FIG. 4, the search data is set to "3213" in the first change. In the case of again changing the search data, since "2" is easily erroneously recognized as "3" by referring to a point B, the search data is set to "3310". In a manner similar to the above, the search data is respectively changed to "3290" and "0210" by sequentially referring to a point C and a point D.

The above changing processes are all based on "3210".

As described above, according to the embodiment, the data regarding the recognition error ratios of characters have previously been formed and the input search data is changed in accordance with the frequencies of appearance of the characters, so that there is an effect such that even the image data which has erroneously been recognized upon formation of the index data can be easily searched at a high speed.

Since the index data can be rewritten when the image data could be searched, there is an effect such that in the case of again executing the same searching process, desired image data can be searched without an error.

What is claimed is:

1. An image processing apparatus, comprising:
   input means for inputting image data;
   recognizing means for recognizing input image data and for producing corresponding index data from recognized image data;
   memory means for storing input image data and index data obtained by recognizing the input image data;
   searching means for searching said memory means for desired index data in accordance with an input request;
   changing means for changing the request on the basis of stored information regarding a character recognition error in the case desired index data does not exist in said memory means; and
   control means for controlling said searching means to search said memory means for the desired index data on the basis of the changed request.

2. An apparatus according to claim 1, wherein the change of the request by said changing means is stopped by a predetermined instruction.

3. An apparatus according to claim 1, wherein the searching operation by the searching means and the changing operation by the changing means are repeated until the index data is searched.

4. An apparatus according to claim 1, wherein the request for desired index data is rewritten as index data by a predetermined instruction.

5. An apparatus according to claim 1, wherein the information regarding the character recognition error is stored in accordance with the order of recognition error ratios from the higher recognition error ratio on the basis of results of recognition experiments.

6. An image processing method, comprising the steps of:
   inputting image data;
   recognizing input image data and producing corresponding index data from recognized image data;
   storing input image data and index data obtained by recognizing the input image data in a memory;
   searching said memory for desired index data in accordance with an input request; and
   changing the request on the basis of stored information regarding a character recognition error when the desired index data does not exist in said memory; and
   controlling said searching means to search said memory means for the desired index data on the basis of the changed request.

7. A method according to claim 6, wherein the change of the request is stopped by a predetermined instruction.

8. A method according to claim 6, wherein the searching step and the changing step are repeated until the image data is searched.

9. A method according to claim 6, wherein the request for desired index data is rewritten as index data by a predetermined instruction.

10. A method according to claim 6, wherein the information regarding the character recognition error is stored in accordance with the order of recognition error ratios from the higher recognition error ratio on the basis of the results of recognition experiments.

11. An apparatus according to claim 1, wherein the change of the request by said changing means is stopped when the number of changing operations has reached a predetermined number of changing times.

12. A method according to claim 6, wherein the change of the request is stopped when the number of changing operations has reached a predetermined number of changing times.

* * * * *